(12) United States Patent
Abels

(10) Patent No.: US 6,350,075 B1  
(45) Date of Patent: Feb. 26, 2002

(54) BELLOWS SEAL

(75) Inventor: Olaf Abels, Beim (DE)

(73) Assignee: ZF Lemförder, Metallwaren AG (DE)

( * ) Notice: Subject to any disclaimer, the term of this patent is extended or adjusted under 35 U.S.C. 154(b) by 0 days.

(21) Appl. No.: 09/554,717

(22) PCT Filed: Sep. 10, 1999

(86) PCT No.: PCT/DE99/02873

§ 371 Date: May 18, 2000

§ 102(e) Date: May 18, 2000

(87) PCT Pub. No.: WO00/17529

PCT Pub. Date: Mar. 30, 2000

(30) Foreign Application Priority Data

Sep. 19, 1998 (DE) ........................................ 198 43 063

(51) Int. Cl.$^7$ ................................................. F16C 11/06
(52) U.S. Cl. ......................... 403/134; 403/51; 277/635
(58) Field of Search ............................ 403/50, 51, 134, 403/122, 135, 140; 277/635, 637

(56) References Cited

U.S. PATENT DOCUMENTS

| | | | | |
|---|---|---|---|---|
| 2,197,037 A | * | 4/1940 | Gardner ...................... | 403/134 |
| 3,472,540 A | * | 10/1969 | Gottschald ................... | 403/51 |
| 3,476,417 A | * | 11/1969 | Born et al. .................. | 403/134 |
| 4,220,418 A | * | 9/1980 | Kondo et al. ........... | 403/134 X |
| 4,305,596 A | * | 12/1981 | Unterstrasser .......... | 277/635 X |
| 4,650,362 A | * | 3/1987 | Kubo .......................... | 403/134 |
| 4,685,686 A | * | 8/1987 | Weiler ...................... | 403/50 X |
| 5,100,254 A | * | 3/1992 | Wasada ....................... | 403/134 |

FOREIGN PATENT DOCUMENTS

| | | | | |
|---|---|---|---|---|
| GB | 1000622 | * | 8/1965 | ................. 403/134 |
| GB | 1006462 | * | 10/1965 | ................. 403/134 |
| JP | 199317 | * | 8/1990 | ................. 403/134 |

* cited by examiner

Primary Examiner—Harry C. Kim  
(74) Attorney, Agent, or Firm—McGlew and Tuttle, P.C

(57) ABSTRACT

A bellows seal (1) on a ball-and-socket joint provided with joint ball and ball pivot (2), especially on a ball-and-socket joint of a chassis bearing, with an elastic bellows has a pivot-side opening and a joint-side opening and axially surrounds the ball pivot (2) of the ball-and-socket joint. A circumferential, elastic and outwardly pointing sealing lip (6), which can be in contact with a sealing surface (7), is provided at the pivot-side opening of the sealing bellows (1). An L-ring, whose first leg (9) points essentially in the axial direction (axial leg) and whose second leg (10) points radially to the outside (radial leg), is provided at the pivot-side opening. The radial leg (10) engages a groove extending on the inside of the sealing bellows (1) or is anchored in it, and the inside of the axial leg (9) is sealingly in contact with an opposite running surface.

23 Claims, 3 Drawing Sheets

BELLOWS SEAL

FIELD OF THE INVENTION

The present invention pertains to a bellows seal on a ball-and-socket provided with a joint ball and a ball pivot, especially on a ball-and-socket joint of a chassis bearing, with an elastic bellows, which has a pivot-side opening and a joint-side opening and surrounds the ball pivot of the ball-and-socket joint, wherein a said circumferential, elastic and outwardly pointing sealing lip, which is in contact with a sealing surface, is provided at the pivot-side opening of the sealing bellows, wherein an L-ring, whose first leg points essentially in the axial direction (axial leg) and whose second leg points radially to the outside (radial leg), is provided at the pivot-side opening.

BACKGROUND OF THE INVENTION

DE 36 18 565 C2 describes a bellows seal on a ball-and-socket joint provided with joint ball and ball pivot, especially a ball-and-socket joint of a chassis bearing, with an elastic bellows, which has a pivot-side opening and a joint-side opening and surrounds the ball pivot of the ball-and-socket joint, wherein a circumferential, elastic sealing lip pointing to the outside is provided at the pivot-side opening of the sealing bellows.

A bellows seal has been known from German Auslegeschrift DE 12 66 074. This Auslegeschrift shows a bellows seal on a ball-and-socket joint provided with joint ball and ball pivot with an elastic bellows, which has a pivot-side opening and a joint-side opening and axially surrounds the ball pivot of the ball-and-socket joint, wherein a circumferential, elastic sealing lip pointing to the outside is arranged at the pivot-side opening of the sealing bellows. Furthermore, a crown-like cylinder ring, which is provided with grease discharge channels and is to bring about a stiffening of the end of the bellows, is arranged at the pivot-side opening.

It has been found during the use of such bellows seals, especially in the area of chassis bearings, that such an embodiment is susceptible to corrosion and the sealing effect of the bellows seal declines after an excessively short time of use.

SUMMARY AND OBJECTS OF THE INVENTION

The object of the present invention is therefore to provide a bellows seal that brings about better and more lasting sealing and whose susceptibility to corrosion is reduced.

According to the invention a ball-and-socket joint bellows seal is provided. The ball-and-socket joint has a joint ball and a ball pivot, especially on a ball-and-socket joint of a chassis bearing, with an elastic bellows. The elastic bellows has a pivot-side opening and a joint-side opening and surrounds the ball pivot of the ball-and-socket joint. A circumferential, elastic and outwardly pointing sealing lip is in contact with a sealing surface. The sealing lip is provided at the pivot-side opening of the sealing bellows, wherein an L-ring, whose first leg points essentially in an axial direction (axial leg) and whose second leg points radially to the outside (radial leg), is provided at the pivot-side opening. The radial leg engages a groove extending on the inside of the sealing bellows and the inner side of the axial leg is sealingly in contact with an opposite running surface.

Thus, it is proposed that a bellows seal for a ball-and-socket joint provided with joint ball and ball pivot, especially for a ball-and-socket joint of a chassis bearing, with an elastic bellows, which has a pivot-side opening and a joint-side opening and axially surrounds the ball pivot of the ball-and-socket joint, wherein a circumferential, elastic and outwardly pointing sealing lip, which can be in contact with a sealing surface, is provided at the pivot-side opening of the sealing bellows, be further improved such that an L-ring, whose first leg points essentially in the axial direction (axial leg) and whose second leg points radially to the outside (radial leg), is provided at the pivot-side opening, wherein the radial leg engages or is anchored in a groove extending on the inside of the sealing bellows and the inner side of the axial leg is sealingly in contact with an opposite surface.

It is achieved with this embodiment according to the present invention that the bellows seal has a preliminary seal and a principal seal. The preliminary seal comprises the sealing lip and the opposite sealing surface. This preliminary seal keeps out essentially coarse dirt and other coarser contaminants. The principal seal is located in the protected area and is formed by the L-ring and a running surface.

The bellows seal may be designed in an advantageous manner such that the running surface located sealingly opposite the inside of the axial leg forms part of the ball pivot, and the cylindrical part of the ball pivot is preferably used for this purpose.

In another advantageous embodiment, the sealing lip, the sealing surface, the L-ring and the ball pivot form a hollow space, which may also be filled with grease, silicones or other agents to improve the sealing.

In another, particularly advantageous embodiment of the bellows seal, an intermediate ring is pulled on the ball pivot radially inside the L-ring, so that its outside forms a running surface for the axial leg of the L-ring. It is possible as a result to obtain especially favorable sliding properties and sealing properties between the L-ring and the intermediate ring by correspondingly selecting the materials of the L-ring and the intermediate ring. Furthermore, corrosion of the sealing seat is prevented by the intermediate ring. The intermediate ring may advantageously have a U-shaped design, wherein the outer legs or the outer beads point radially to the outside and a running surface is thus formed between the two beads, in which the L-ring is arranged in its position in a well-defined manner.

To simplify assembly, the intermediate ring may also be divided in the circumferential direction, so that the U-ring is composed of two mutually opposite L-shaped rings of identical design.

In another, particularly advantageous embodiment of the bellows seal, the length of the radial leg of the L-ring and the depth of the groove, which is engaged by the radial leg, are coordinated with one another such that a distance a is formed between the outside of the axial leg of the L-ring and the bellows. The sealing bellows has additional freedom of movement and elasticity due to this design, which leads to a longer service life of the sealing bellows.

The bellows seal may be advantageously also designed such that the L-ring is so elastic that the angle between the axial leg and the radial leg of the L-ring can be changed during the assembly. This means that the L-ring is stressed during the assembly, and this stress improves the seating of the L-ring on the running surface. Premature release or slipping off of the L-ring from the running surface is thus prevented from occurring.

Furthermore, the L-ring and/or the intermediate ring may be made of plastic. Graphite-reinforced PTFE has proved to be particularly advantageous.

Consequently, an especially advantageous embodiment of the design has an L-shaped sealing ring made of plastic, which exerts a shape-stabilizing effect for the pivot-side sealing seat at the same time. Graphite-reinforced PTFE, which has proved to be advantageous in sealing systems and has higher wear resistance and elasticity than pure PIFE, may be used as the material for the L-ring. The widening of the L-ring during assembly leads to increased surface pressure, which prevents water from penetrating. For simplified assembly, the pivot of the ball-and-socket joint has a bead, on which the L-ring can be supported.

This mode of construction separates the keeping away of dirt and splash water from the sealing against seeping water and other moisture. It is advantageous for optimal function to coat the sealing surface located opposite the sealing lip of the sealing bellows in order not to increase the wear on the sealing surfaces by rust particles. Another possibility is to use a corrosion-protected washer as a sealing surface.

The features of the present invention, which were described above and will be explained below, may be used, of course, not only in the particular combination described, but also in other combinations or alone without going beyond the scope of the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
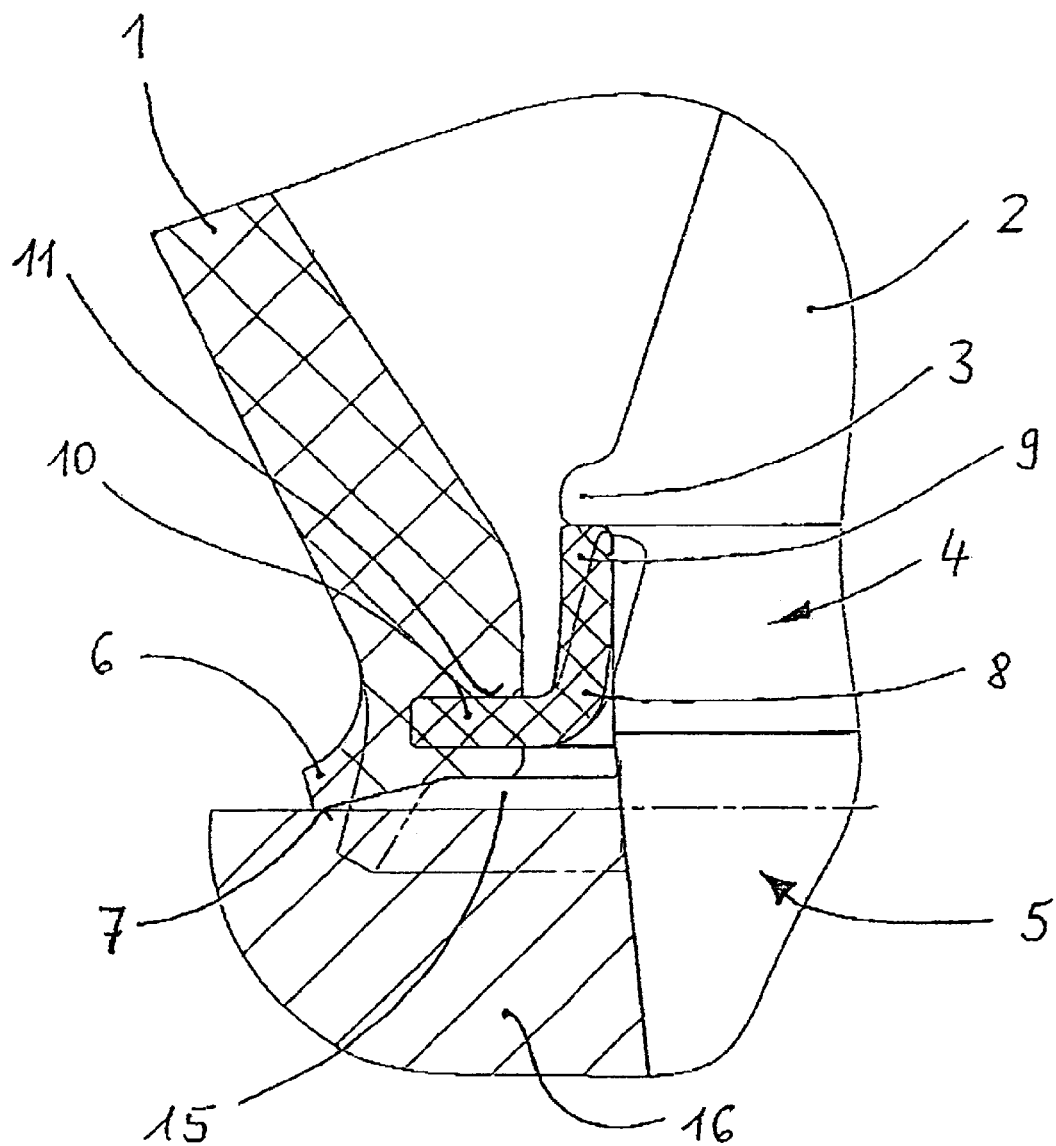
FIG. 1 is a partially sectional view showing a bellows seal according to the present invention with L-ring.

Referring to the drawings in particular, FIG. 1 shows a detail of a cross section of the bellows seal of a ball-and-socket joint of a chassis bearing with a ball pivot 2, which—not visible here—extends upward to the joint ball. The ball pivot has a circumferential bead 3, with a downwardly adjoining cylindrical part 4, which passes over into a conical part 5 in the downward direction. The lever eye 16 of the chassis bearing is mounted in the area of the bellows seal. The lever eye 16 has a sealing surface 7, on which the sealing lip 6 of the sealing bellows 1 is supported. In the end area of the pivot-side opening of the sealing bellows 1, the sealing bellows has a groove 11, which is engaged by the radial leg 10 of the L-ring 8 or in which it is anchored. The radial leg 10 is usually vulcanized into the sealing bellows 1. The L-ring 8 has an axial leg 9, which is pushed on the cylindrical part 4 of the ball pivot and is fixed by the bead 3 of the ball pivot.

In the released, unassembled state, the sealing lip 6 of the sealing bellows 1 is designed such that, as is indicated by the non cross-hatched area, it extends obliquely in the downward direction, whereas it is in contact with the sealing surface 7 in the assembled state under pretension. A hollow space 15, which is limited by the sealing lip, the sealing surface of the L-ring and the ball pivot, is formed behind the sealing lip 6.

The axial leg 9 of the L-ring 8 likewise points to the inside (nonshaded representation) before the assembly and is pretensioned during the assembly.

Both the surface of the ball pivot 2 in the area of the running surface of the L-ring 8 and the sealing surface 7 of the lever eye 16 are preferably protected from corrosion, so that rust particles on the sealing surfaces can be avoided.

Figure 2:
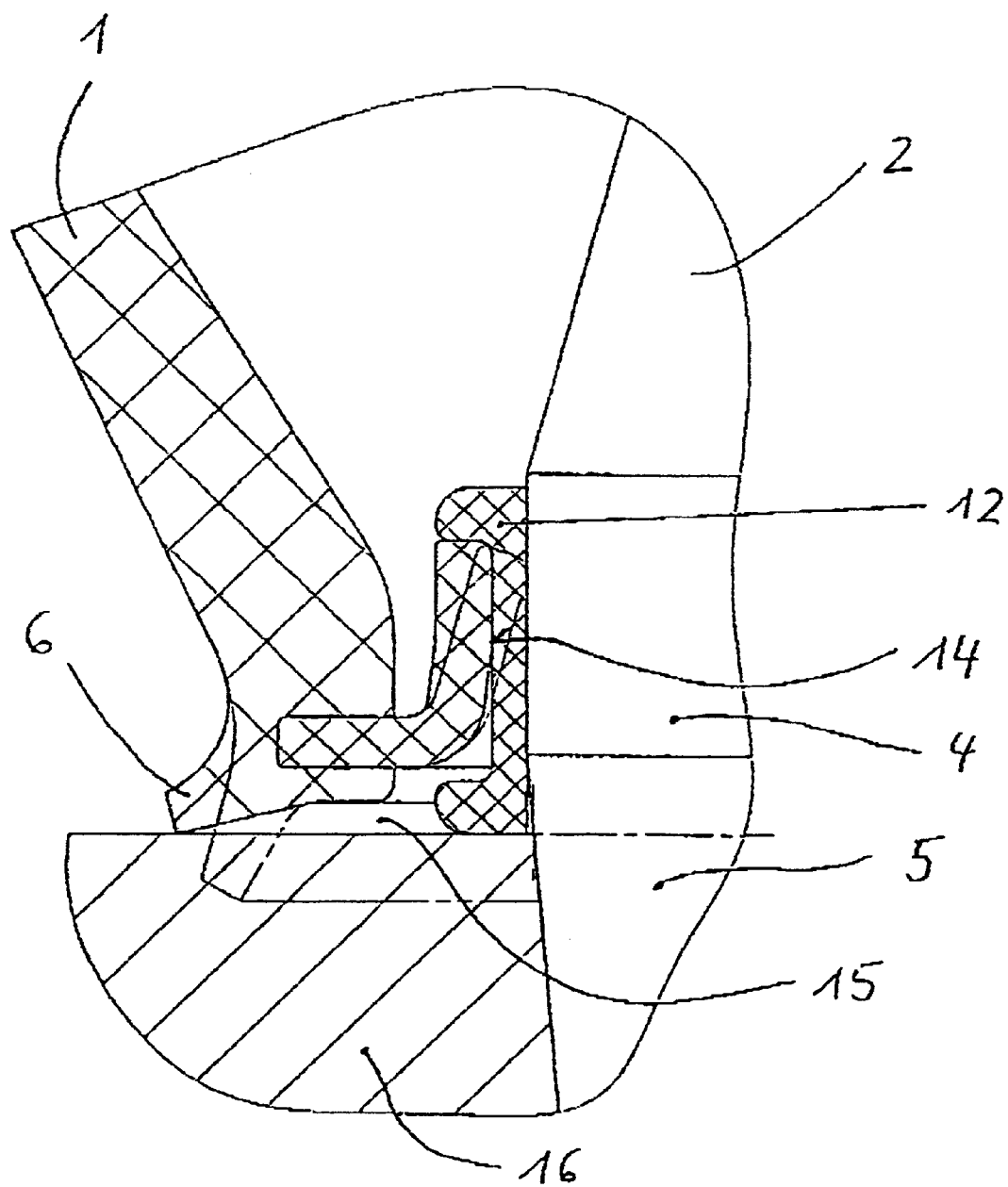
FIG. 2 is a partially sectional view of a bellows seal according to the present invention with L-ring and intermediate ring.

FIG. 2 shows another, improved embodiment of the bellows seal according to the present invention corresponding to FIG. 1, but an intermediate ring 12 is additionally arranged between the L-ring 8 and the ball pivot 2. With its inside, the intermediate ring 12 is rigidly in contact with the cylindrical-conical part of the ball pivot 2 and has on the end side beads 13.1 and 13.2, which form the running surface 14 for the axial leg of the L-ring. The sealing properties and the wear properties on the running surface 14 can be optimized by correspondingly selecting the material for the intermediate ring 12 and the L-ring 8.

Figure 3:
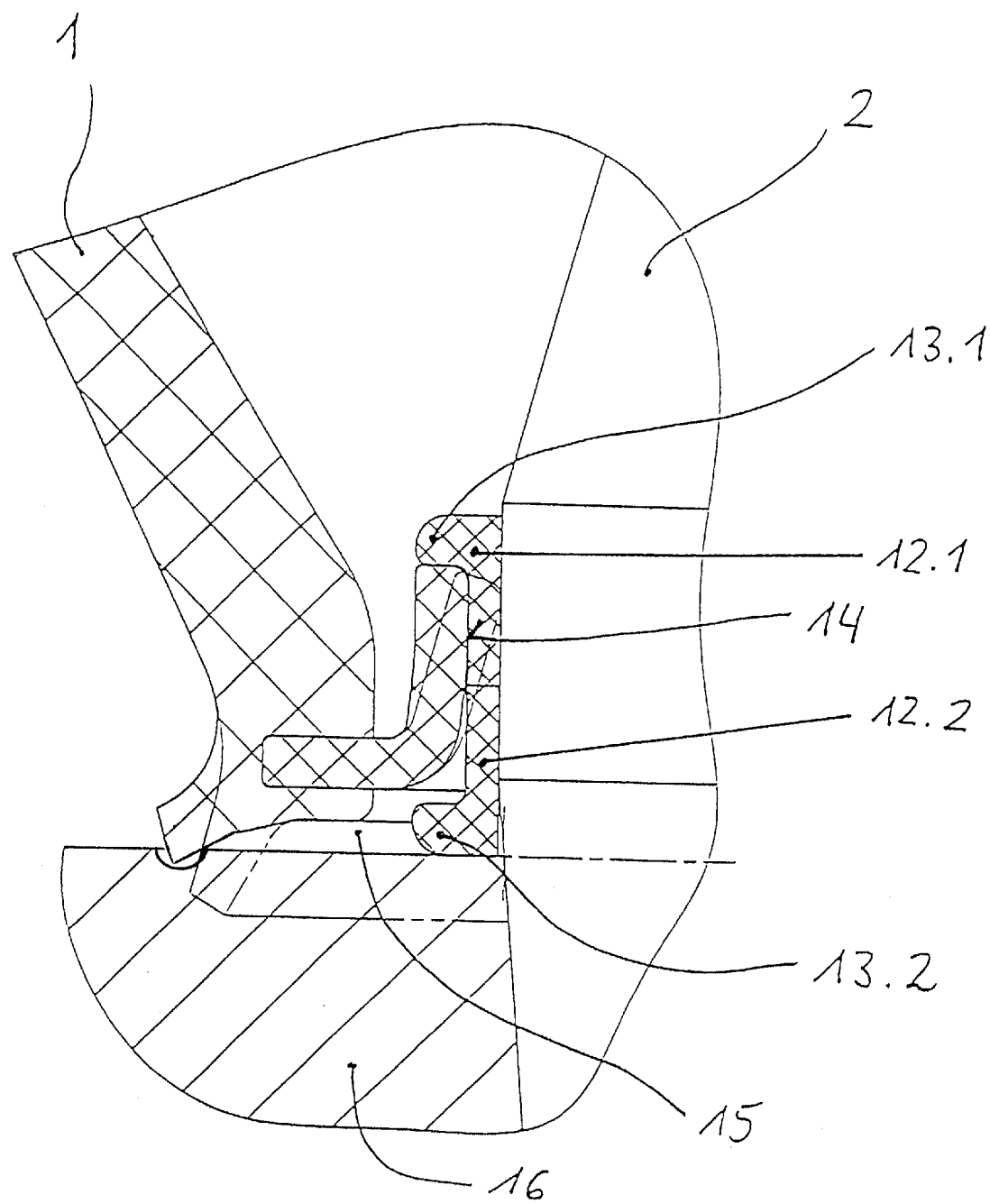
FIG. 3 is a partially sectional view of a bellows seal according to the present invention with a two-part intermediate ring.

FIG. 3 shows a variation of FIG. 2, in which the intermediate ring 12 is designed as a two-part ring comprising the parts 12.1 and 12.2 and which thus makes possible a simpler assembly and a simpler tool for manufacturing the ring. In addition, parting on the running surface is avoided in the manufacture in the case of the use of a plastic ring. A sealing groove 17 is provided in the sealing surface 7. The sealing lip 6 of the sealing bellow 1 engages sealing the groove 17 in the sealing surface.

On the whole, it is achieved due to the embodiments of the bellows seal shown and described above that the sealing performance is improved and the wear on the bellows seal is reduced. This leads to a prolongation of the service life of the bellows seal according to the present invention compared with the state of the art.

While specific embodiments of the invention have been shown and described in detail to illustrate the application of the principles of the invention, it will be understood that the invention may be embodied otherwise without departing from such principles.

What is claimed is:

1. A bellows seal on a ball-and-socket joint provided with joint ball and ball pivot with an elastic bellows, which has a pivot-side opening and a joint-side opening and surrounds the ball pivot of the ball-and-socket joint, the bellows seal comprising:

a circumferential, elastic and outwardly pointing sealing lip;

a sealing surface provided at the pivot-side opening of the elastic bellows, said outwardly pointing sealing lip being in contact with said sealing surface;

an L-ring, with a first leg pointing essentially in an axial direction of the ball pivot formable of a water tight seal with the ball pivot and with a second leg pointing radially to the outside, provided at the pivot-side opening; and a groove extending on the inside of the said elastic bellows, said radial leg engaging said groove, an inner side of said first leg being sealingly in contact with a surface.

2. A bellows seal in accordance with claim 1, wherein said surface is a running surface located sealingly opposite the inside of said first leg and is a cylindrical part of the ball pivot.

3. A bellows seal in accordance with claim 1, wherein a hollow space is formed between said sealing lip, said sealing surface, said L-ring and the ball pivot.

4. A bellows seal in accordance with claim 1, wherein an intermediate ring is pressed onto the ball pivot radially inside said L-ring, said intermediate ring has an outside surface in contact with said first leg of said L-ring.

5. A bellows seal in accordance with claim 4, wherein said intermediate ring is a U-shaped ring, whose outer legs or beads point radially to an outside of the ball-and-socket joint.

6. A bellows seal in accordance with claim 4, wherein said intermediate ring is divided in a circumferential direction into ring parts.

7. A bellows seal in accordance with claim 4, wherein one or both of said L-ring and said intermediate ring are formed of plastic.

8. A bellows seal in accordance with claim 4, wherein one or both of said L-ring and said intermediate ring are formed of metal.

9. A bellows seal in accordance with claim 8, wherein the metal of one or both of said L-ring and said intermediate ring is coated.

10. A bellows seal in accordance with claim 4, with said outside surface of said intermediate ring further comprising a bead associated with said surface, for limiting the pushing on of said L-ring.

11. A bellows seal in accordance with claim 1, wherein a length of said second leg of said L-ring and a depth of the groove are coordinated with one another such that there is a distance "a" between the outside of said first leg of said L-ring and said bellows.

12. A bellows seal in accordance with claim 1, wherein said L-ring is made elastic whereby an angle between the axial leg and the radial leg can be changed during assembly.

13. A bellows seal in accordance with claim 1, further comprising a bead associated with said surface, at the pivot side opening, for limiting the pushing on of said L-ring.

14. A bellows seal in accordance with claim 1, wherein said L-ring consists of metal.

15. A bellows seal in accordance with claim 1, wherein said L-ring consists of plastic.

16. A bellows seal in accordance with claim 1, wherein in the area of said sealing lip of said bellows, said sealing surface has a groove, which is engaged by said sealing lip.

17. A bellows seal for a chassis bearing ball-and-socket joint, comprising:
   a ball pivot with joint ball;
   an elastic bellows, having a pivot-side opening and a joint-side opening and surrounding the ball pivot of the ball-and-socket joint;
   a circumferential, elastic and outwardly pointing sealing lip connected to said elastic bellows;
   a sealing surface provided at the pivot-side opening of said elastic bellows, said outwardly pointing sealing lip being in contact with said sealing surface;
   an L-ring having an axial leg pointing essentially in an axial direction of the ball pivot and with a radial leg pointing essentially radially to the outside, an inner side of said axial leg and said surface of said ball pivot being arranged to form a watertight seal; and
   a groove extending on an inside of said elastic bellows, said radial leg engaging said groove.

18. A bellows seal in accordance with claim 17, wherein said surface is a running surface located sealingly opposite the inside of said axial leg and is a cylindrical part of said ball pivot.

19. A bellows seal in accordance with claim 17, wherein a hollow space is formed between said sealing lip, said sealing surface, said L-ring and said ball pivot.

20. A bellows seal in accordance with claim 17, wherein an intermediate ring is pressed onto the ball pivot radially inside said L-ring such that its outside forms said surface as a running surface for said axial leg of said L-ring.

21. A bellows seal in accordance with claim 20, wherein said intermediate ring is a U-shaped ring, with outer legs or beads pointing radially to an outside of the ball-and-socket joint.

22. A bellows seal for a ball joint comprising:
   a elastic bellow body having a pivot side opening and a joint side opening, a mating notch and a seal lip formed integral to said elastic bellow body at said joint side opening, said sealing lip being formable of a seal with a mating surface of the ball joint;
   a ring having an L-shaped cross section with a first leg extending substantially radially outwards with respect to said ring and a second leg extending essentially in an axial direction with respect to said ring, said second leg of said ring has a corner end and a distal end, an unbiased diameter of said distal end being smaller than a diameter of said corner end, said distal end being deformable from said unbiased distal diameter to a larger diameter when said ring is arranged on a shaft component of the ball joint, said first leg of said ring engaging said mating notch of said elastic bellow body, said second leg of said ring being formable of a seal with the shaft component of the ball joint, said corner end diameter being larger than said distal end diameter providing for an increase in sealing pressure simultaneous with flexibility for ease of installation on said shaft component.

23. A bellows seal for a ball joint according to claim 22, wherein the L-shaped ring is arranged with respect to said elastic bellow body so to cause rotation of said first leg towards the mating surface, when said L-shaped ring is placed on the shaft component.

* * * * *